United States Patent
Jin et al.

(10) Patent No.: US 9,832,742 B2
(45) Date of Patent: Nov. 28, 2017

(54) METHOD FOR DETERMINING TRANSMIT POWER AND USER EQUIPMENT

(71) Applicant: Huawei Technologies Co., Ltd., Shenzhen (CN)

(72) Inventors: Hui Jin, Beijing (CN); Li Shen, Beijing (CN); Zhe Li, Wuhan (CN); Nengfu Tang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/377,342

(22) Filed: Dec. 13, 2016

(65) Prior Publication Data
US 2017/0094613 A1  Mar. 30, 2017

Related U.S. Application Data

(63) Continuation of application No. PCT/CN2014/079881, filed on Jun. 13, 2014.

(51) Int. Cl.
*H04W 52/36* (2009.01)
*H04W 74/08* (2009.01)
*H04W 52/24* (2009.01)
*H04W 52/06* (2009.01)

(52) U.S. Cl.
CPC ......... *H04W 52/367* (2013.01); *H04W 52/06* (2013.01); *H04W 52/242* (2013.01); *H04W 74/0833* (2013.01)

(58) Field of Classification Search
CPC .................. H04W 74/0833; H04W 52/367
USPC ................ 455/522, 69, 452.1, 509
See application file for complete search history.

(56) References Cited

U.S. PATENT DOCUMENTS

| 2010/0041428 A1* | 2/2010 | Chen | H04W 52/16 455/522 |
| 2012/0071186 A1* | 3/2012 | He | H04W 52/325 455/509 |
| 2015/0043512 A1* | 2/2015 | Jeong | H04W 28/06 370/329 |
| 2016/0165623 A1* | 6/2016 | Pan | H04W 74/002 370/336 |

FOREIGN PATENT DOCUMENTS

| CN | 101094015 A | 12/2007 |
| CN | 102651907 A | 8/2012 |
| WO | 2011087274 A2 | 7/2011 |

OTHER PUBLICATIONS

"Corrections to power control and random access," 3GPP TSG-RAN2 Meeting #64, R2-086396, Prague, Czech Republic, 3rd Generation Partnership Project, Valbonne, France (Nov. 10-14, 2008).

* cited by examiner

*Primary Examiner* — John J Lee
(74) *Attorney, Agent, or Firm* — Leydig, Voit & Mayer, Ltd.

(57) ABSTRACT

The present disclosure discloses a method for determining transmit power and a user equipment, which relates to the field of information technologies, and can improve a success rate of establishing a connection between the user equipment and a base station. The method includes: determining, according to a preconfigured rule, a transmit power used for sending a random access message; and, sending the random access message to a base station by using the determined transmit power. The present disclosure is applicable to establishment of the connection between the user equipment and the base station.

20 Claims, 2 Drawing Sheets

_(1)_

METHOD FOR DETERMINING TRANSMIT POWER AND USER EQUIPMENT

CROSS-REFERENCE TO RELATED APPLICATIONS

This application is a continuation of International Application No. PCT/CN2014/079881, filed on Jun. 13, 2014, the disclosure of which is hereby incorporated by reference in its entirety.

TECHNICAL FIELD

The present disclosure relates to the field of information technologies, and in particular, to a method for determining transmit power and user equipment.

BACKGROUND

User equipment (UE) receives a system broadcast message sent by a base station, and the UE sends a random access message to the base station according to the system broadcast message, so that the UE and the base station establish a connection.

Currently, the UE determines, according to a formula $P=\min\{P_{MAX}, P_{initial\ value}+(N_{pre}-1)*\Delta P_{rampup}\}$, transmit power for sending the random access message, where P is the transmit power used for sending the random access message, $P_{MAX}$ is maximum transmit power, $P_{initial\ value}$ is initial transmit power, $N_{pre}$ is a quantity of times for sending the random access message in a process of a current round of a random access attempt, and $\Delta P_{rampup}$ is an added value of transmit power for sending the random access message two consecutive times in the process of the current round of the random access attempt, $P_{initial\ value}$ is obtained by using $P_{initial\ value}=PL+P_{o\_pre}+\Delta_{pre}$, where PL is a downlink path loss, $P_{o\_pre}$ is initial target receive power for a preamble code carried in the random access message, and $\Delta_{pre}$ is a format offset of the preamble code.

However, when the transmit power is directly determined according to the foregoing formula, in a case in which a downlink path loss is less than an uplink path loss, the transmit power determined according to the foregoing formula is less than transmit power that is actually required. Therefore, the random access message sent according to the determined transmit power cannot be sent to the base station, causing a relatively success rate of establishing the connection between the UE and the base station.

SUMMARY

The present disclosure provides a method for determining transmit power and user equipment, which can improve a success rate of establishing a connection between UE and a base station.

Technical solutions used in the present disclosure are as follows:

According to a first aspect, the present disclosure provides a method for determining transmit power, including:

determining, according to a preconfigured rule, transmit power used for sending a random access message; and sending the random access message to a base station by using the determined transmit power.

With reference to the first aspect, in a first possible implementation manner of the first aspect, the determining, according to a preconfigured rule, transmit power used for sending a random access message includes:

determining, according to $P=\min\{P_{MAX}, P_{initial\ value}+(N_{pre}-1)*\Delta P_{rampup}+(N-1)*P_{compensation}\}$, the transmit power used for sending the random access message, where $P_{compensation}$ is compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the first possible implementation manner of the first aspect, in a second possible implementation manner of the first aspect, $P_{compensation}$ is preconfigured; and before the determining, according to $P=\min\{P_{MAX}, P_{initial\ value}+(N_{pre}-1)*\Delta P_{rampup}+(N-1)*P_{compensation}\}$, the transmit power used for sending the random access message, the method further includes:

acquiring $P_{compensation}$ from a nonvolatile entry.

With reference to the first possible implementation manner of the first aspect, in a third possible implementation manner of the first aspect, before the determining, according to $P=\min\{P_{MAX}, P_{initial\ value}+(N_{pre}-1)*\Delta P_{rampup}+(N-1)*P_{compensation}\}$, the transmit power used for sending the random access message, the method further includes:

determining $P_{compensation}$; and the determining $P_{compensation}$ includes:

determining $P_{compensation}$ according to $P_{compensation}=P_{MAX}-[P_{initial\ value}+(N_{pre\ max}-1)*\Delta P_{rampup}]$, where $P_{MAX} \geq P_{initial\ value}+(N_{pre\ max}-1)*\Delta P_{rampup}$; or determining $P_{compensation}$ according to $P_{compensation}=P_{MAX}-[P_{initial\ value}+(N_{pre\ max}-X)*\Delta P_{rampup}]$, where $P_{MAX} \geq P_{initial\ value}+(N_{pre\ max}-1)*\Delta P_{rampup}$ and X is a quantity of times for sending according to the maximum transmit power in the process of the current round of the random access attempt.

With reference to the first aspect, in a fourth possible implementation manner of the first aspect, the determining, according to a preconfigured rule, transmit power used for sending a random access message includes:

determining, according to $P=\min\{P_{MAX}, P_{initial\ value}+(N_{pre}-1)*[\Delta P_{rampup}+(N-1)*(N_{pre}-1)*P_{step\ compensation}]\}$, the transmit power used for sending the random access message, where $P_{step\ compensation}$ is step compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the fourth possible implementation manner of the first aspect, in a fifth possible implementation manner of the first aspect, $P_{step\ compensation}$ is preconfigured; and before the determining, according to $P=\min\{P_{MAX}, P_{initial\ value}+(N_{pre}-1)*[\Delta P_{rampup}+(N-1)*(N_{pre}-1)*P_{step\ compensation}]\}$, the transmit power used for sending the random access message, the method further includes:

acquiring $P_{step\ compensation}$ from a nonvolatile entry.

With reference to the fourth possible implementation manner of the first aspect, in a sixth possible implementation manner of the first aspect, before the determining, according to $P=\min\{P_{MAX}, P_{initial\ value}+(N_{pre}-1)*[\Delta P_{rampup}(N-1)*(N_{pre}-1)*P_{step\ compensation}]\}$, the transmit power used for sending the random access message, the method further includes:

determining $P_{step\ compensation}$; and the determining $P_{step\ compensation}$ includes:

determining $P_{step\ compensation}$ according to $P_{step\ compensation}=\{P_{MAX}-[P_{initial\ value}+(N_{pre\ max}-1)*\Delta P_{rampup}]\}/(N_{pre\ max}-1)$, where $P_{MAX} \geq P_{initial\ value}+(N_{pre\ max}-1)*\Delta P_{rampup}$; or determining $P_{step\ compensation}$ according to $P_{step\ compensation}=\{P_{MAX}-[P_{initial\ value}+(N_{pre\ max}-X)*\Delta P_{rampup}]\}/(N_{pre\ max}-X)$, where $P_{MAX} \geq P_{initial\ value}+(N_{pre\ max}-1)*\Delta P_{rampup}$, and X is a quantity of times for sending according to the maximum transmit power in the process of the current round of the random access attempt.

With reference to the first aspect, in a seventh possible implementation manner of the first aspect, the determining, according to a preconfigured rule, transmit power used for sending a random access message includes:

determining, according to $P=\min\{P_{MAX}, P_{initial\ value}+PL*(N-1)*X_{PL}+(N_{pre}-1)*\Delta P_{rampup}\}$, the transmit power used for sending the random access message, where $X_{PL}$ is a path loss compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the first aspect, in an eighth possible implementation manner of the first aspect, the determining, according to a preconfigured rule, transmit power used for sending a random access message includes:

determining, according to $P=\min\{P_{MAX}, P_{initial\ value}+(N_{pre}-1)*[\Delta P_{rampup}+\Delta P_{rampup}(N-1)*X_{\Delta P}]\}$, the transmit power used for sending the random access message, where $X_{\Delta P}$ is a step compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, in a ninth possible implementation manner of the first aspect, $P_{initial\ value}$ is determined according to $P_{initial\ value}=PL+P_{o\_pre}+\Delta_{pre}$ where PL is a downlink path loss, $P_{o\_pre}$ is initial target receive power for a preamble code carried in the random access message, and $\Delta_{pre}$ is a format offset of the preamble code.

With reference to the first aspect or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, in a tenth possible implementation manner of the first aspect, after the sending the random access message to a base station by using the determined transmit power, the method further includes:

if the quantity of attempt rounds for the random access message is greater than or equal to 2, recording a cell identity of a current cell; and when the cell identified by the cell identity is re-entered and the random access message is sent to the base station, determining, according to the quantity of attempt rounds that is an integer greater than or equal to 2, the transmit power used for sending the random access message.

With reference to the tenth possible implementation manner of the first aspect, in an eleventh possible implementation manner of the first aspect, after the recording a cell identity of a current cell, the method further includes:

when time in which the cell identity is being recorded is greater than or equal to preconfigured time, deleting the recorded cell identity; or when user equipment restarts, deleting the recorded cell identity.

According to a second aspect, the present disclosure provides user equipment, including:

a determining unit, configured to determine, according to a preconfigured rule, transmit power used for sending a random access message; and a transceiver unit, configured to send the random access message to a base station by using the transmit power determined by the determining unit.

With reference to the second aspect, in a first possible implementation manner of the second aspect, the determining unit is specifically configured to determine, according to $P=\min\{P_{MAX}, P_{initial\ value}+(N_{pre}-1)*\Delta P_{rampup}+(N-1)*P_{compensation}\}$, the transmit power used for sending the random access message, where $P_{compensation}$ is compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the first possible implementation manner of second aspect, in a second possible implementation manner of the second aspect, $P_{compensation}$ is preconfigured; and the apparatus further includes: an acquisition unit, where $P_{compensation}$ is acquired by the acquisition unit from a nonvolatile entry.

With reference to the first possible implementation manner of the second aspect, in a third possible implementation manner of the second aspect, $P_{compensation}$ is determined by the determining unit according to $P_{compensation}=P_{MAX}-[P_{initial\ value}+(N_{pre\ max}-1)*\Delta P_{rampup}]$, where $P_{MAX} \geq P_{initial\ value}+(N_{pre\ max}-1)*\Delta P_{rampup}$; or $P_{compensation}$ is determined by the determining unit according to $P_{compensation}=P_{MAX}-[P_{initial\ value}+(N_{pre\ max}-X)*\Delta P_{rampup}]$, where $P_{MAX} \geq P_{initial\ value}+(N_{pre\ max}-1)*\Delta P_{rampup}$, and X is a quantity of times for sending according to the maximum transmit power in the process of the current round of the random access attempt.

With reference to the second aspect, in a fourth possible implementation manner of the second aspect, the determining unit is specifically configured to determine, according to $P=\min\{P_{MAX}, P_{initial\ value}+(N_{pre}-1)*[\Delta P_{rampup}+(N-1)*(N_{pre}-1)*P_{step\ compensation}]\}$, the transmit power used for sending the random access message, where $P_{step\ compensation}$ is step compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the fourth possible implementation manner of second aspect, in a fifth possible implementation manner of the second aspect, $P_{step\ compensation}$ is preconfigured; and $P_{step\ compensation}$ is acquired by the acquisition unit from a nonvolatile entry.

With reference to the fourth possible implementation manner of the second aspect, in a sixth possible implementation manner of the second aspect, $P_{step\ compensation}$ is determined by the determining unit according to $P_{step\ compensation}=\{P_{MAX}-[P_{initial\ value}+(N_{pre\ max}-1)*\Delta P_{rampup}]\}/(N_{pre\ max}-1)$, where $P_{MAX} \geq P_{initial\ value}+(N_{pre\ max}-1)*\Delta P_{rampup}$; or $P_{step\ compensation}$ is determined by the determining unit according to $P_{step\ compensation}=\{P_{MAX}-[P_{initial\ value}+(N_{pre\ max}-X)*\Delta P_{rampup}]\}/(N_{pre\ max}-X)$, where $P_{MAX} \geq P_{initial\ value}+(N_{pre\ max}-1)*\Delta P_{rampup}$, and X is a quantity of times for sending according to the maximum transmit power in the process of the current round of the random access attempt.

With reference to the second aspect, in a seventh possible implementation manner of the second aspect, the determining unit is specifically configured to determine, according to $P=\min\{P_{MAX}, P_{initial\ value}+PL*(N-1)*X_{PL}+(N_{pre}-1)*\Delta P_{rampup}\}$, the transmit power used for sending the random access message, where $X_{PL}$ is a path loss compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the second aspect, in an eighth possible implementation manner of the second aspect, the determining unit is specifically configured to determine, according to $P=\min\{P_{MAX}, P_{initial\ value}+(N_{pre}-1)*[\Delta P_{rampup}+\Delta P_{rampup}*(N-1)*X_{\Delta P}]\}$, the transmit power used for sending the random access message, where $X_{\Delta P}$ is a step compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, in a ninth possible implementation manner of the second aspect, $P_{initial\ value}$ is determined by the determining unit according to $P_{initial\ value}=PL+P_{o\_pre}\Delta_{pre}$, where PL is a downlink path loss, $P_{o\_pre}$ is initial target receive power for a preamble code carried in the random access message, and $\Delta_{pre}$ is a format offset of the preamble code.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, or the ninth possible implementation manner of the second aspect, in a tenth possible implementation manner of the second aspect, the apparatus further includes: a recording unit, where the recording unit is configured to: when the quantity of attempt rounds for the random access message is greater than or equal to 2, record a cell identity of a current cell; and the determining unit is further configured to: when the cell identified by the cell identity that is recorded by the recording unit is re-entered and the random access message is sent to the base station, determine, according to the quantity of attempt rounds that is an integer greater than or equal to 2, the transmit power used for sending the random access message.

With reference to the tenth possible implementation manner of the second aspect, in an eleventh possible implementation manner of the second aspect, the apparatus further includes: a deletion unit, where the deletion unit is configured to: when time in which the cell identity is being recorded is greater than or equal to preconfigured time, delete the cell identity recorded by the recording unit; and the deletion unit is further configured to: when the user equipment restarts, delete the cell identity recorded by the recording unit.

According to a third aspect, the present disclosure provides user equipment, including:

a processor, configured to determine, according to a preconfigured rule, transmit power used for sending a random access message; and a transceiver, configured to send the random access message to a base station by using the transmit power determined by the processor.

With reference to the third aspect, in a first possible implementation manner of the third aspect, the processor is specifically configured to determine, according to $P=\min\{P_{MAX}, P_{initial\ value}+(N_{pre}-1)*\Delta P_{rampup}+(N-1)*P_{compensation}\}$, the transmit power used for sending the random access message, where $P_{compensation}$ is compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the first possible implementation manner of the third aspect, in a second possible implementation manner of the third aspect, $P_{compensation}$ is preconfigured; and $P_{compensation}$ is acquired by the processor from a nonvolatile entry.

With reference to the first possible implementation manner of the third aspect, in a third possible implementation manner of the third aspect, $P_{compensation}$ is determined by the processor according to $P_{compensation}=P_{MAX}-[P_{initial\ value}+(N_{pre\ max}-1)\Delta P_{rampup}]$, where $P_{MAX} \geq P_{initial\ value}+(N_{pre\ max}-1)*\Delta P_{rampup}$; or $P_{compensation}$ is determined by the processor according to $P_{compensation}=P_{MAX}-[P_{initial\ value}+(N_{pre\ max}-X)*\Delta P_{rampup}]$, where $P_{MAX} \geq P_{initial\ value}+(N_{pre\ max}-1)*\Delta P_{rampup}$, and X is a quantity of times for sending according to the maximum transmit power in the process of the current round of the random access attempt.

With reference to the third aspect, in a fourth possible implementation manner of the third aspect, the processor is specifically configured to determine, according to $P=\min\{P_{MAX}, P_{initial\ value}+(N_{pre}-1)*[\Delta P_{rampup}+(N-1)*(N_{pre}-1)*P_{step\ compensation}]\}$, the transmit power used for sending the random access message, where step compensation is step compensation power, P is the transmit power used for sending the random access message, $P_{MAX}$ is maximum transmit power $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the fourth possible implementation manner of the third aspect, in a fifth possible implementation manner of the third aspect, $P_{step\ compensation}$ is preconfigured; and $P_{step\ compensation}$ is acquired by the processor from a nonvolatile entry.

With reference to the fourth possible implementation manner of the third aspect, in a sixth possible implementation manner of the third aspect, $P_{step\ compensation}$ is determined by the processor according to $P_{step\ compensation}\{P_{MAX}-[P_{initial\ value}+(N_{pre\ max}-1)*\Delta P_{rampup}]\}/(N_{pre\ max}-1)$, where $P_{MAX} \geq P_{initial\ value}+(N_{pre\ max}-1)*\Delta P_{rampup}$; or $P_{step\ compensation}$ is determined by the processor according to $P_{step\ compensation}=\{P_{MAX}-[P_{initial\ value}+(N_{pre\ max}-X)*\Delta P_{rampup}]\}/(N_{pre\ max}-X)$, where $P_{MAX} \geq P_{initial\ value}+(N_{pre\ max}-1)*\Delta P_{rampup}$, and X is a quantity of times for sending according to the maximum transmit power in the process of the current round of the random access attempt.

With reference to the third aspect, in a seventh possible implementation manner of the third aspect, the processor is specifically configured to determine, according to $P=\min\{P_{MAX}, P_{initial\ value}+PL*(N-1)*X_{PL}+(N_{pre}-1)*\Delta P_{rampup}\}$, the transmit power used for sending the random access message, where $X_{PL}$ is a path loss compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the third aspect, in an eighth possible implementation manner of the third aspect, the processor is specifically configured to determine, according to $P=\min\{P_{MAX}, P_{initial\ value}+(N_{pre}-1)*[\Delta P_{rampup}+\Delta P_{rampup}*(N-1)*X_{\Delta P}]\}$, the transmit power used for sending the random access message, where $X_{\Delta P}$ is a step compensation coefficient, P is the transmit power used for sending the random access message, $P_{MAX}$ is maximum transmit power, $P_{initial\ value}$ is initial transmit power, $P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

With reference to the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, in a ninth possible implementation manner of the third aspect $P_{initial\ value}$ is determined by the processor according to $P_{initial\ value} = PL + P_{o\_pre} + \Delta_{pre}$, where PL is a downlink path loss, $P_{o\_pre}$ is initial target receive power for a preamble code carried in the random access message, and $\Delta_{pre}$ is a format offset of the preamble code.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the ninth possible implementation manner of the third aspect, in a tenth possible implementation manner of the third aspect, the processor is further configured to: when the quantity of attempt rounds for the random access message is greater than or equal to 2, record a cell identity of a current cell; and the processor is further configured to: when the cell identified by the cell identity is re-entered and the random access message is sent to the base station, determine, according to the quantity of attempt rounds that is an integer greater than or equal to 2, the transmit power used for sending the random access message.

With reference to the tenth possible implementation manner of the third aspect, in an eleventh possible implementation manner of the third aspect, the processor is further configured to: when time in which the cell identity is being recorded is greater than or equal to preconfigured time, delete the recorded cell identity; and the processor is further configured to: when the user equipment restarts, delete the recorded cell identity.

In the method for determining transmit power and the user equipment according to the present disclosure, transmit power used for sending a random access message is first determined according to a preconfigured rule, and then the random access message is sent to a base station by using the determined transmit power. Compared with a current manner in which transmit power is directly determined according to a downlink path loss, in the present disclosure, the transmit power is increased by a compensation value, so that the transmit power can be increased by appropriate compensation when the downlink path loss is less than an uplink path loss, and a success rate of establishing a connection between UE and a base station is improved.

BRIEF DESCRIPTION OF DRAWINGS

To describe the technical solutions in the present disclosure more clearly, the following briefly describes the accompanying drawings required for describing the present disclosure or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
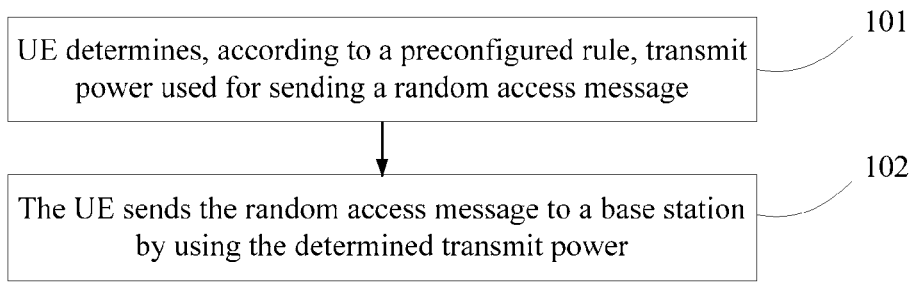
FIG. 1 is a flowchart of a method for determining transmit power according to an embodiment of the present disclosure.

An embodiment of the present disclosure provides a method for determining transmit power, which can improve a success rate of establishing a connection between UE and a base station. As shown in FIG. 1, the method includes the following steps:

101. The UE determines, according to a preconfigured rule, transmit power used for sending a random access message.

Specifically, step 101 may be that the UE determines, according to the preconfigured rule, transmit power that is obtained after a compensation value is added and that is used for sending the random access message.

The UE may determine, by using $P = \min\{P_{MAX}, P_{initial\ value} + (N_{pre}-1)*\Delta P_{rampup}\}$, transmit power that exists before the compensation value is added, where P is the transmit power that exists before the compensation value is added, $P_{MAX}$ is maximum transmit power, $P_{initial\ value}$ is initial transmit power, $N_{pre}$ is a quantity of times for sending the random access message in a process of a current round of a random access attempt, $N_{pre}$ is an integer greater than or equal to 1 and less than or equal to $N_{pre\ max}$, $N_{pre\ max}$ a maximum quantity of attempts in the process of the current round of the random access attempt, and $\Delta P_{rampup}$ is an added value of transmit power for sending the random access message two consecutive times in the process of the current round of the random access attempt.

For this embodiment of the present disclosure, when the UE and the base station establish the connection by using the 4th generation mobile communications technology (4G), the random access message may carry a preamble code. In this case, the initial transmit power $P_{initial\ value}$ for the random access message may be determined by using $P_{initial\ value}=PL+P_{o\_pre}+\Delta_{pre}$, where PL is a downlink path loss, $P_{o\_pre}$ is initial target receive power for the preamble code carried in the random access message, and $\Delta_{pre}$ is a format offset of the preamble code.

It should be noted that this embodiment of the present disclosure is not limited to the foregoing 4th generation mobile communications technology, and other technologies that can implement connection establishment between the UE and the base station, such as both the 2nd generation mobile communications technology (2G) and the 3rd generation mobile communications technology (3G), are applicable to this embodiment of the present disclosure.

For this embodiment of the present disclosure, before step 101, the method may further include: receiving, by the UE, a system information block type 2 (SIB-2) message broadcasted by the base station. RACH-ConfigCommon of a radioResourceConfigCommon field of the SIB-2 message may carry specific values respectively corresponding to $P_{MAX}$, $P_{o\_pre}$, $N_{pre\ max}$, and $\Delta P_{rampup}$.

For this embodiment of the present disclosure, the SIB-2 message received by the UE may further carry reference signal received power (RSRP). In this case, before step 101, the method may further include: subtracting, by the UE, actually received RSRP from the RSRP carried in the SIB-2 message, to obtain the downlink path loss (PL).

102. The UE sends the random access message to the base station by using the determined transmit power.

Specifically, step 102 may be that the UE sends the random access message to the base station by using the determined transmit power that is obtained after the compensation value is added and that is used for sending the random access message.

For this embodiment of the present disclosure, after the UE sends the random access message to the base station according to the transmit power P for the first time, if a random access response sent by the base station is not received, the UE increases the transmit power P according to the added value $\Delta P_{rampup}$ of the transmit power, and resends the random access message to the base station according to increased transmit power until the random access response sent by the base station is received or the quantity of times for sending the random access message reaches a maximum quantity of sending times. In this embodiment of the present disclosure, when the maximum quantity of sending times is reached but the random access response sent by the base station is still not received, after waiting for a period of time, the UE sends the random access message in a second round until the random access response sent by the base station is received.

It should be noted that a process in which the UE performs $N_{pre\ max}$ attempts according to the added value $\Delta P_{rampup}$ of the transmit power for the first time is a process of a first round of the random access attempt. The process of the first round of the random access attempt performed by the UE is a process in which a non-access stratum (NAS) instructs an access stratum (AS) to perform this round of the random access attempt. If the UE fails in the first round of the random access attempt, the UE may perform the second round and a subsequent round of the random access attempt.

A process of the second round and the subsequent round of the random access attempt performed by the UE may be directly initiated by the AS, or after a previous round of the random access attempt fails, the AS may report to the NAS, and the NAS instructs the AS to perform this round of the attempt.

In the method for determining transmit power according to this embodiment of the present disclosure, transmit power used for sending a random access message is first determined according to a preconfigured rule, and then the random access message is sent to a base station by using the determined transmit power. Compared with a current manner in which transmit power is directly determined by using a downlink path loss, in this embodiment of the present disclosure, the transmit power is increased by a compensation value, so that the transmit power can be increased by appropriate compensation when the downlink path loss is less than an uplink path loss. Therefore, it can be ensured that the random access message sent according to transmit power to which the compensation value is added can be sent to the base station, and further, a success rate of establishing a connection between UE and the base station can be improved.

Figure 2:
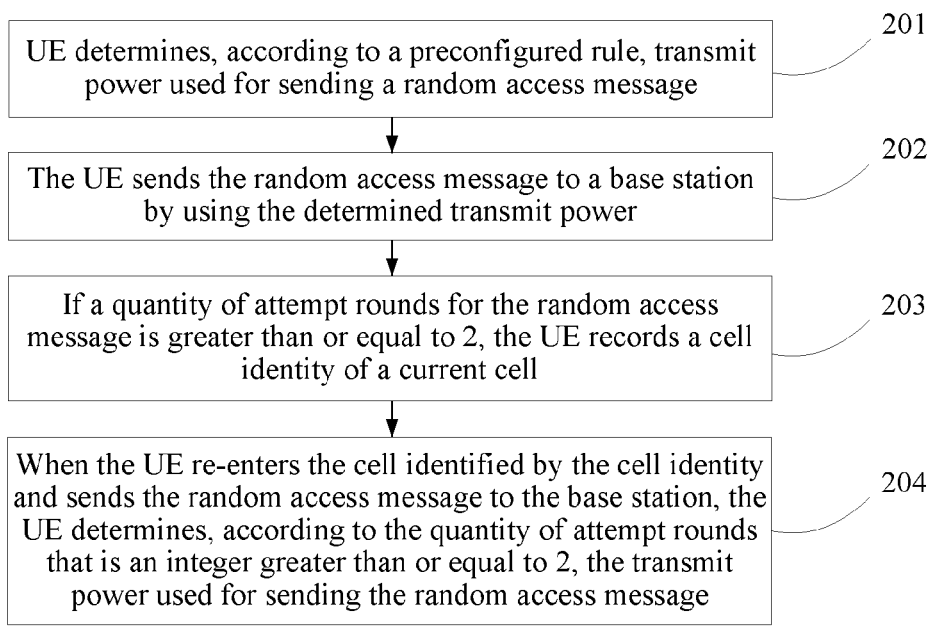
FIG. 2 is a flowchart of another method for determining transmit power according to an embodiment of the present disclosure.

In a specific description of the method shown in FIG. 1, an embodiment of the present disclosure provides another method for determining transmit power. As shown in FIG. 2, the method includes the following steps:

201. UE determines, according to a preconfigured rule, transmit power used for sending a random access message.

Specifically, step 201 may be that the UE determines, according to the preconfigured rule, transmit power that is obtained after a compensation value is added and that is used for sending the random access message.

It should be noted that in this embodiment of the present disclosure, for a corresponding description of transmit power that exists before the compensation value is added, reference may be made to the corresponding description in step 101, and details are not described herein again.

Optionally, step 201 may be specifically that the UE determines, according to $P=\min\{P_{MAX}, P_{initial\ value}+(N_{pre}-1)*\Delta P_{rampup}+(N-1)*P_{compensation}\}$, the transmit power used for sending the random access message, where $P_{compensation}$ is compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

For this embodiment of the present disclosure, when an AS may actively initial a second round and a subsequent round of the random access attempt, the AS actively records a quantity N of rounds of the current random access attempt; when an AS needs to perform the second round and the subsequent round of the random access attempt according to an instruction of an NAS, the NAS sends a quantity N of rounds of the current attempt to the AS. It should be noted that in the following embodiments, for a corresponding description of the quantity of rounds of the random access attempt, reference may be made to the corresponding description herein, and details are not described again in the following.

For this embodiment of the present disclosure, $P_{compensation}$ may be preconfigured. In this case, before step 201, the method may further include: acquiring, by the UE, $P_{compensation}$ from a non-volatile (NV) entry, where $P_{compensation}$ may be preconfigured in the UE.

For this embodiment of the present disclosure, $P_{compensation}$ may be determined according to an actual status of the UE. In this case, before step 201, the method may further include: determining, by the UE, $P_{compensation}$.

For this embodiment of the present disclosure, the determining, by the UE, $P_{compensation}$ may be specifically: determining, by the UE, $P_{compensation}$ according to $P_{compensation}=P_{MAX}-[P_{initial\ value}+(N_{pre\ max}-1)*\Delta P_{rampup}]$, where $P_{MAX} \geq P_{initial\ value}+(N_{pre\ max}-1)*\Delta P_{rampup}$.

For this embodiment of the present disclosure, transmit power may be increased by compensation $(N-1)*P_{compensation}$ by using the foregoing formula, that is, transmit power for sending the random access message each time in each round is increased by $P_{compensation}$, compared with transmit power for sending the random access message at a corresponding time in a previous round. In this embodiment of the present disclosure, if $P_{MAX} \geq P_{initial\ value}+(N_{pre\ max}-1)*\Delta P_{rampup}$ is met, when the random access message is sent at the $N_{pre\ max}$ time in the second round (that is, the last time in the second round), the maximum transmit power can be reached, and in a third round and a subsequent round, the random access message is each sent according to the maximum transmit power, so that a success rate of establishing a connection between the UE and a base station can be improved.

Further, the UE may preconfigure a quantity of times for sending according to the maximum transmit power in the process of the current round of the random access attempt. In this case, the determining, by the UE, $P_{compensation}$ may be specifically: determining, by the UE, $P_{compensation}$ according to $P_{compensation}=P_{MAX}-[P_{initial\ value}+(N_{pre\ max}-X)*\Delta P_{rampup}]$, where $P_{MAX} \geq P_{initial\ value}+(N_{pre\ max}-1)*\Delta P_{rampup}$, and X is the quantity of times for sending according to the maximum transmit power in the process of the current round of the random access attempt. In this embodiment of the present disclosure, the UE preconfigures the quantity of times for sending according to the maximum transmit power in the process of the current round of the random access attempt, which can increase compensation power for the random access message according to a user requirement, can reduce a quantity of sending times required to reach the maximum transmit power, and can further shorten attempt time for establishing the connection between the UE and the base station.

For this embodiment of the present disclosure, transmit power may be increased by compensation $(N-1)*P_{compensation}$ by using the foregoing formula, that is, transmit power for sending the random access message each time in each round is increased by $P_{compensation}$, compared with transmit power for sending the random access message at a corresponding time in a previous round. In this embodiment of the present disclosure, if $P_{MAX} \geq P_{initial\ value}+(N_{pre\ max}-1)*\Delta P_{rampup}$ is met, when the random access message is sent at the $N_{pre\ max}-X+1$ time in the second round, the maximum transmit power can be reached, and after the $N_{pre\ max}-X+1$ time in the second round, the random access message is each sent according to the maximum transmit power, so that the success rate of establishing the connection between the UE and the base station can be improved.

Alternatively, step 201 may be that the UE determines, according to $P=\min\{P_{MAX}, P_{initial\ value}+(N_{pre}-1)*[\Delta P_{rampup}+(N-1)*(N_{pre}-1)*P_{step\ compensation}]\}$, the transmit power used for sending the random access message, where $P_{step\ compensation}$ is step compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

For this embodiment of the present disclosure, $P_{step\ compensation}$ may be preconfigured. In this case, before step 201, the method may further include: acquiring, by the UE, $P_{step\ compensation}$ from a non-volatile entry, where $P_{step\ compensation}$ may be preconfigured in the UE.

For this embodiment of the present disclosure, $P_{step\ compensation}$ may be determined according to an actual status of the UE. In this case, before step 201, the method may further include: determining, by the UE, $P_{step\ compensation}$.

For this embodiment of the present disclosure, the determining, by the UE, $P_{step\ compensation}$ may be specifically: determining, by the UE, $P_{step\ compensation}$ according to $P_{step\ compensation}=\{P_{MAX}-[P_{initial\ value}+(N_{pre\ max}-1)*\Delta P_{rampup}]\}/(N_{pre\ max}-1)$, where $P_{MAX} \geq P_{initial\ value}+(N_{pre\ max}-1)*\Delta P_{rampup}$.

For this embodiment of the present disclosure, transmit power may be increased by compensation $(N-1)*(N_{pre}-1)*P_{step\ compensation}$ by using the foregoing formula, that is, transmit power for sending the random access message each time in each round is increased by $P_{step\ compensation}$, compared with transmit power for sending the random access message at a previous time in the current round. In this embodiment of the present disclosure, if $P_{MAX} \geq P_{initial\ value}+(N_{pre\ max}-1)*\Delta P_{rampup}$ is met, when the random access message is sent at the $N_{pre\ max}$ time in n a second round (that is, the last time in the second round), the maximum transmit power can be reached, and in a third round and a subsequent round, the random access message is each sent according to the maximum transmit power, so that a success rate of establishing a connection between the UE and a base station can be improved.

Further, the UE may preconfigure a quantity of times for sending according to the maximum transmit power in the process of the current round of the random access attempt. In this case, the determining, by the UE, $P_{step\ compensation}$ may be specifically: determining, by the UE, $P_{step\ compensation}$ according to $P_{step\ compensation}=\{P_{MAX}-[P_{initial\ value}+(N_{pre\ max}-X)*\Delta P_{rampup}]\}/(N_{pre\ max}-X)$, where $P_{MAX} \geq P_{initial\ value}+(N_{pre\ max}-1)*\Delta P_{rampup}$, and X is the quantity of times for sending according to the maximum transmit power in the process of the current round of the random access attempt. In this embodiment of the present disclosure, the UE preconfigures the quantity of times for sending according to the maximum transmit power in the process of the current round of the random access attempt, which can increase the step compensation power for the random access message according to a user requirement, can reduce a quantity of sending times required to reach the maximum transmit power, and can further shorten attempt time for establishing the connection between the UE and the base station.

For this embodiment of the present disclosure, transmit power may be increased by compensation $(N-1)*(N_{pre}-1)*P_{step\ compensation}$ by using the foregoing formula, that is, transmit power for sending the random access message each time in each round is increased by $P_{step\ compensation}$ compared with transmit power for sending the random access message at a previous time in the current round. In this embodiment of the present disclosure, if $P_{MAX} \geq P_{initial\ value}+(N_{pre\ max}-1)*\Delta P_{rampup}$ is met, when the random access message is sent at the $N_{pre\ max}-X+1$ time in the second round, the maximum transmit power can be reached, and after the $N_{pre\ max}-X+1$ time in the second round, the random access message is each sent according to the maximum transmit power, so that the success rate of establishing the connection between the UE and the base station can be improved, where X is a quantity of times for sending according to the maximum transmit power in each round.

Alternatively, step 201 may be that the UE determines, according to $P=\min\{P_{MAX}, P_{initial\ value}+PL*(N-1)*X_{PL}+(N_{pre}-1)*\Delta P_{rampup}\}$, the transmit power used for sending the random access message, where $X_{PL}$ is a path loss compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

For this embodiment of the present disclosure, the path loss compensation coefficient $X_{PL}$ may be preconfigured in the UE and may be an integer or a decimal. For example, the path loss compensation coefficient $X_{PL}$ may be 0.2, 0.5, 1.3, or 3. In this embodiment of the present disclosure, transmit power may be increased by compensation $PL*(N-1)*X_{PL}$ by using the foregoing formula, that is, transmit power for sending the random access message each time in each round is increased by $PL*X_{PL}$, compared with transmit power for sending the random access message at a corresponding time in a previous round.

Alternatively, step 201 may be that the UE determines, according to $P=\min\{P_{MAX}, P_{initial\ value}+(N_{pre}-1)*[\Delta P_{rampup}+\Delta P_{rampup}*(N-1)*X_{\Delta P}]\}$, the transmit power used for sending the random access message, where $X_{\Delta P}$ is a step compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

For this embodiment of the present disclosure, the step compensation coefficient $X_{\Delta P}$ may be preconfigured in the UE and may be an integer or a decimal. For example, the step compensation coefficient $X_{\Delta P}$ may be 0.8, 1.2, 2, or 4.5. In this embodiment of the present disclosure, transmit power may be increased by compensation $\Delta P_{rampup}*(N-1)*X_{\Delta P}$ by using the foregoing formula, that is, transmit power for sending the random access message each time in each round is increased by $\Delta P_{rampup}*X_{\Delta P}$, compared with transmit power for sending the random access message at a corresponding time in a previous round.

For this embodiment of the present disclosure, transmit power that is of the first round and is determined by using each of the foregoing formulas is the same as the transmit power that exists before the compensation value is added, which can avoid a case in which compensation is still performed on the transmit power when the random access message can be sent to the base station by using the transmit power that exists before the compensation value is added, so that current transmit power of the UE can be decreased, and interference in another UE can be reduced.

For this embodiment of the present disclosure, when the UE and the base station establish the connection by means of 4G the random access message may carry a preamble code. In this case, $P_{initial\ value}$ may be determined according to $P_{initial\ value}=PL+P_{o\_pre}+\Delta_{pre}$, where PL is a downlink path loss, $P_{o\_pre}$ is initial target receive power for the preamble code carried in the random access message, and $\Delta_{pre}$ is a format offset of the preamble code.

It should be noted that this embodiment of the present disclosure is not limited to the foregoing 4G technology, and other technologies that can implement connection establishment between the UE and the base station, such as a 2G technology and a 3G technology, are all applicable to this embodiment of the present disclosure.

202. The UE sends the random access message to a base station by using the determined transmit power.

Specifically, step 202 may be that the UE sends, according to the transmit power obtained after the compensation value is added, the random access message that carries the preamble code to the base station.

For this embodiment of the present disclosure, after the UE sends the random access message to the base station according to the transmit power for the first time, if a random access response sent by the base station is not received, the UE increases the transmit power, and resends the random access message to the base station until the random access response sent by the base station is received or the quantity of times for sending the random access message reaches a maximum quantity of sending times. In this embodiment of the present disclosure, when the maximum quantity of sending times is reached but the random access response sent by the base station is still not received, after waiting for a random period of time, the UE sends the random access message in the second round until the random access response sent by the base station is received.

203. If a quantity of attempt rounds for the random access message is greater than or equal to 2, the UE records a cell identity of a current cell.

Optionally, after step 203, the method may further include: when time in which the cell identity is being recorded (Identity, "ID" for short) is greater than or equal to preconfigured time, the UE deletes the recorded cell identity, where the preconfigured time may be preconfigured by the UE.

For this embodiment of the present disclosure, the recorded cell ID is deleted after the preconfigured time is reached, which can avoid a case in which when an uplink path loss and the downlink path loss change, the UE always sends the random access message according to the transmit power obtained after the compensation value is added, and can decrease the current transmit power of the UE and reduce the interference in the another UE on condition that the connection successfully established between the UE and the base station is ensured.

Alternatively, after step 203, the method may further include: when the UE restarts, deleting, by the UE, the recorded cell identity.

204. When the UE re-enters the cell identified by the cell identity and sends the random access message to the base station, the UE determines, according to the quantity of attempt rounds that is an integer greater than or equal to 2, the transmit power used for sending the random access message.

For this embodiment of the present disclosure, when the UE re-enters the cell identified by the cell ID and sends the random access message to the base station, the UE directly determines, according to the quantity of attempt rounds that is an integer greater than or equal to 2, the transmit power obtained after the compensation value is added, and sends the random access message according to the transmit power obtained after the compensation value is added, which can avoid a step of sending the random access message in the first round according to the transmit power that exists before the compensation value is added, and can further shorten the attempt time for establishing the connection between the UE and the base station.

In the method for determining transmit power according to this embodiment of the present disclosure, transmit power used for sending a random access message is first determined according to a preconfigured rule, and then the random access message is sent to a base station by using the determined transmit power. Compared with a current manner in which transmit power is directly determined by using a downlink path loss, in this embodiment of the present disclosure, the transmit power is increased by a compensation value, so that the transmit power can be increased by appropriate compensation when the downlink path loss is less than an uplink path loss. Therefore, it can be ensured that the random access message sent according to transmit power to which the compensation value is added can be sent to the base station, and further, a success rate of establishing a connection between UE and the base station can be improved.

Further, in the method for determining transmit power according to this embodiment of the present disclosure, the UE preconfigures a quantity of times for sending according to maximum transmit power in a process of a current round of a random access attempt, which can increase compensation power for the random access message or step compensation power for the random access message according to a user requirement, can reduce a quantity of sending times required to reach the maximum transmit power, and can further shorten attempt time for establishing the connection between the UE and the base station. Transmit power that is of the first round and is determined by using each of foregoing formulas is the same as the transmit power that exists before the compensation value is added, which can avoid a case in which compensation is still performed on the transmit power when the random access message can be sent to the base station by using the transmit power that exists before the compensation value is added, and can reduce current transmit power of the UE and reduce interference in another UE. A recorded cell ID is deleted after preconfigured time is reached, which can avoid a case in which when the uplink path loss and the downlink path loss change, the UE always sends the random access message according to the transmit power obtained after the compensation value is added, and can decrease the current transmit power of the UE and reduce the interference in the another UE on condition that the connection successfully established between the UE and the base station is ensured. When the UE re-enters a cell identified by the cell ID and sends the random access message to the base station, the UE directly determines, according to a quantity N of attempt rounds that is an integer greater than or equal to 2, the transmit power obtained after the compensation value is added, and sends the random access message according to the transmit power obtained after the compensation value is added, which can avoid a step of sending the random access message in the first round according to the transmit power that exists before the compensation value is added, and can further shorten the attempt time for establishing the connection between the UE and the base station.

Figure 3:
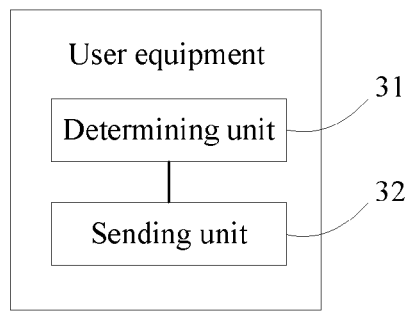
FIG. 3 is a schematic structural diagram of user equipment according to an embodiment of the present disclosure.

Further, for implementing the methods shown in FIG. 1 and FIG. 2, an embodiment of the present disclosure further provides user equipment, configured to improve a success rate of establishing a connection between the user equipment and a base station. As shown in FIG. 3, the user equipment includes: a determining unit 31 and a transceiver unit 32.

The determining unit 31 is configured to determine, according to a preconfigured rule, transmit power used for sending a random access message.

The transceiver unit 32 is configured to send the random access message to a base station by using the transmit power determined by the determining unit 31.

The determining unit 31 is specifically configured to determine, according to $P=\min\{P_{MAX}, P_{initial\ value}+(N_{pre}-1)*\Delta P_{rampup}+(N-1)*P_{compensation}\}$, the transmit power used for sending the random access message, where $P_{compensation}$ is compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

Optionally, $P_{compensation}$ is preconfigured.

Figure 4:
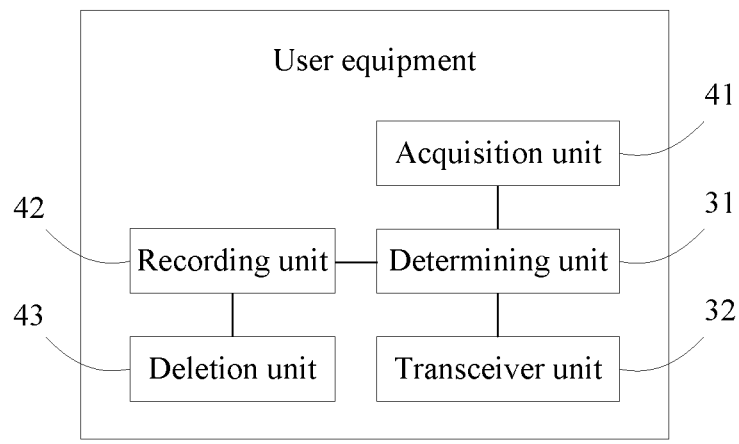
FIG. 4 is a schematic structural diagram of another user equipment according to an embodiment of the present disclosure.

Further, as shown in FIG. 4, the user equipment further includes: an acquisition unit 41.

$P_{compensation}$ is acquired by the acquisition unit 41 from a nonvolatile entry.

Alternatively, $P_{compensation}$ is determined by the determining unit 31 according to $P_{compensation}=P_{MAX}-[P_{initial\ value}+(N_{pre\ max}-1)*\Delta P_{rampup}]$, where $P_{MAX} \geq P_{initial\ value}+(N_{pre\ max}-1)*\Delta P_{rampup}$.

Alternatively, $P_{compensation}$ is determined by the determining unit 31 according to $P_{compensation}=P_{MAX}-[P_{initial\ value}+(N_{pre\ max}-X)*\Delta P_{rampup}]$, where $P_{MAX} \geq P_{initial\ value}+(N_{pre\ max}-1)*\Delta P_{rampup}$, and X is a quantity of times for sending according to the maximum transmit power in the process of the current round of the random access attempt.

The determining unit 31 is specifically configured to determine, according to $P=\min\{P_{MAX}, P_{initial\ value}+(N_{pre}-1)$

*[$\Delta P_{rampup}$+(N−1)*($N_{pre}$−1)*$P_{step\ compensation}$]}, the transmit power used for sending the random access message, where $P_{step\ compensation}$ is step compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

Optionally, $P_{step\ compensation}$ is preconfigured. $P_{step\ compensation}$ is acquired by the acquisition unit 41 from a nonvolatile entry.

Alternatively, $P_{step\ compensation}$ is determined by the determining unit 31 according to $P_{step\ compensation}$={$P_{MAX}$−[$P_{initial\ value}$+($N_{pre\ max}$−1)*$\Delta P_{rampup}$]}/($N_{pre\ max}$−1), where $P_{MAX} \geq P_{initial\ value}$+($N_{pre\ max}$−1)*$\Delta P_{rampup}$.

Alternatively, $P_{step\ compensation}$ is determined by the determining unit 31 according to $P_{step\ compensation}$={$P_{MAX}$−[$P_{initial\ value}$+($N_{pre\ max}$−X)*$\Delta P_{rampup}$]}/($N_{pre\ max}$−X), where $P_{MAX} \geq P_{initial\ value}$+($N_{pre\ max}$−1)*$\Delta P_{rampup}$, and X a quantity of times for sending according to the maximum transmit power in the process of the current round of the random access attempt.

Optionally, the determining unit 31 is further configured to determine $P_{step\ compensation}$.

$P_{step\ compensation}$ is determined by the determining unit 31 according to $P_{step\ compensation}$={$P_{MAX}$−[$P_{initial\ value}$+($N_{pre\ max}$−1)*$\Delta P_{rampup}$]}/($N_{pre\ max}$−1), where $P_{MAX} \geq P_{initial\ value}$+($N_{pre\ max}$−1)*$\Delta P_{rampup}$; or $P_{step\ compensation}$ is determined by the determining unit 31 according to $P_{step\ compensation}$={$P_{MAX}$−[$P_{initial\ value}$+($N_{pre\ max}$−X)*$\Delta P_{rampup}$]}/($N_{pre\ max}$−X), where $P_{MAX} \geq P_{initial\ value}$+($N_{pre\ max}$−1)*$\Delta P_{rampup}$, and X is a quantity of times for sending according to the maximum transmit power in the process of the current round of the random access attempt.

Optionally, the determining unit 31 is specifically configured to determine, according to P=min{$P_{MAX}$, $P_{initial\ value}$+PL*(N−1)*$X_{PL}$+($N_{pre}$−1)*$\Delta P_{rampup}$}, the transmit power used for sending the random access message, where $X_{PL}$ is a path loss compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

Optionally, the determining unit 31 is specifically configured to determine, according to P=min{$P_{MAX}$, $P_{initial\ value}$+($N_{pre}$−1)*[$\Delta P_{rampup}$+$\Delta P_{rampup}$*(N−1)*$X_{\Delta P}$]}, the transmit power used for sending the random access message, where $X_{\Delta P}$ is a step compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

For this embodiment of the present disclosure, $P_{initial\ value}$ is determined by the determining unit 31 according to $P_{initial\ value}$=PL+$P_{o\_pre}$+$\Delta_{pre}$, where PL is a downlink path loss, $P_{o\_pre}$ is initial target receive power for a preamble code carried in the random access message, and $\Delta_{pre}$ is a format offset of the preamble code.

Optionally, the user equipment further includes: a recording unit 42.

The recording unit 42 is configured to: when the quantity of attempt rounds for the random access message is greater than or equal to 2, record a cell identity of a current cell.

The determining unit 31 is further configured to: when the cell identified by the cell identity that is recorded by the recording unit 42 is re-entered and the random access message is sent to the base station, determine, according to the quantity of attempt rounds that is an integer greater than or equal to 2, the transmit power used for sending the random access message.

Optionally, the user equipment further includes: a deletion unit 43.

The deletion unit 43 is further configured to: when time in which the cell identity is being recorded is greater than or equal to preconfigured time, delete the cell identity recorded by the recording unit 42.

The deletion unit 43 is further configured to: when the user equipment restarts, delete the cell identity recorded by the recording unit 42.

In the user equipment according to this embodiment of the present disclosure, a determining unit first determines, according to a preconfigured rule, transmit power used for sending a random access message, and then a transceiver unit sends the random access message to a base station by using the transmit power determined by the determining unit. Compared with a current manner in which transmit power is directly determined by using a downlink path loss, in this embodiment of the present disclosure, the transmit power is increased by a compensation value, so that the transmit power can be increased by appropriate compensation when the downlink path loss is less than an uplink path loss. Therefore, it can be ensured that the random access message sent according to transmit power to which the compensation value is added can be sent to the base station, and further, a success rate of establishing a connection between the UE and the base station can be improved.

Further, in the user equipment according to this embodiment of the present disclosure, the UE preconfigures a quantity of times for sending according to maximum transmit power in a process of a current round of a random access attempt, which can increase compensation power for the random access message or step compensation power for the random access message according to a user requirement, can reduce a quantity of sending times required to reach the maximum transmit power, and can further shorten attempt time for establishing the connection between the UE and the base station. Transmit power that is of the first round and is determined by using each of foregoing formulas is the same as the transmit power that exists before the compensation value is added, which can avoid a case in which compensation is still performed on the transmit power when the random access message can be sent to the base station by using the transmit power that exists before the compensation value is added, and can reduce current transmit power of the UE and reduce interference in another UE. A recorded cell ID is deleted after preconfigured time is reached, which can avoid a case in which when the uplink path loss and the downlink path loss change, the UE always sends the random access message according to the transmit power obtained after the compensation value is added, and can decrease the current transmit power of the UE and reduce the interference in the another UE on condition that the connection successfully established between the UE and the base station is ensured. When the UE re-enters a cell identified by the cell ID and sends the random access message to the base station, the UE directly determines, according to a quantity N of attempt rounds that is an integer greater than or equal to 2, the transmit power obtained after the compensation value is added, and sends the random access message according to the transmit power obtained after the compensation value is added, which can avoid a step of sending the random access message in the first round according to the transmit power that exists before the compensation value is added, and can further shorten the attempt time for establishing the connection between the UE and the base station.

It should be noted that for other corresponding descriptions of units in the apparatus for determining transmit power in a random access process according to this embodiment of the present disclosure, reference may be made to the corresponding descriptions in FIG. 1 and FIG. 2, and details are not described herein again.

Figure 5:
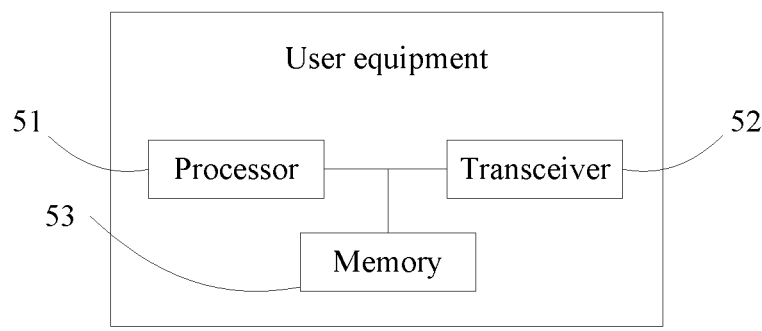
FIG. 5 is a schematic structural diagram of another user equipment according to an embodiment of the present disclosure.

Still further, an embodiment of the present disclosure further provides user equipment, configured to improve a success rate of establishing a connection between the UE and a base station. As shown in FIG. 5, the user equipment includes: a processor 51, a transceiver 52, and a memory 53, where the memory 53 is separately connected to the transceiver 52 and the processor 51.

The processor 51 is configured to determine, according to a preconfigured rule, transmit power used for sending a random access message.

The transceiver 52 is configured to send the random access message to a base station by using the transmit power determined by the processor 51.

The processor 51 is specifically configured to determine, according to $P=\min\{P_{MAX}, P_{initial\ value}+(N_{pre}-1)*\Delta P_{rampup}+(N-1)*P_{compensation}\}$, the transmit power used for sending the random access message, where $P_{compensation}$ is compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

Optionally, $P_{compensation}$ is preconfigured.

$P_{compensation}$ is acquired by the processor 51 from a nonvolatile entry.

Alternatively, $P_{compensation}$ is determined by the processor 51 according to $P_{compensation}=P_{MAX}-[P_{initial\ value}+(N_{pre\ max}-1)*\Delta P_{rampup}]$, where $P_{MAX} \geq P_{initial\ value}+(N_{pre\ max}-1)*\Delta P_{rampup}$.

Alternatively, $P_{compensation}$ is determined by the processor 51 according to $P_{compensation}=P_{MAX}-[P_{initial\ value}+(N_{pre\ max}-X)*\Delta P_{rampup}]$, where $P_{MAX} \geq P_{initial\ value}+(N_{pre\ max}-1)*\Delta P_{rampup}$, and X is a quantity of times for sending according to the maximum transmit power in the process of the current round of the random access attempt.

The processor 51 is specifically configured to determine, according to $P=\min\{P_{MAX}, P_{initial\ value}+(N_{pre}-1)*[\Delta P_{rampup}+(N-1)*(N_{pre}-1)*P_{step\ compensation}]\}$, the transmit power used for sending the random access message, where $P_{step\ compensation}$ is step compensation power, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

Optionally, $P_{step\ compensation}$ is preconfigured.

$P_{step\ compensation}$ is acquired by the processor 51 from a nonvolatile entry.

Alternatively, $P_{step\ compensation}$ is determined by the processor 51 according to $P_{step\ compensation}\{P_{MAX}-[P_{initial\ value}+(N_{pre\ max}-1)*\Delta P_{rampup}]\}/(N_{pre\ max}-1)$, where $P_{MAX} \geq P_{initial\ value}+(N_{pre\ max}-1)*\Delta P_{rampup}$.

Alternatively, $P_{step\ compensation}$ is determined by the processor 51 according to $P_{step\ compensation}=\{P_{MAX}-[P_{initial\ value}+(N_{pre\ max}-X)*\Delta P_{rampup}]\}/(N_{pre\ max}-X)$, where $P_{MAX} \geq P_{initial\ value}+(N_{pre\ max}-1)*\Delta P_{rampup}$, and X is a quantity of times for sending according to the maximum transmit power in the process of the current round of the random access attempt.

The processor 51 is specifically configured to determine, according to $P=\min\{P_{MAX}, P_{initial\ value}+PL*(N-1)*X_{PL}+(N_{pre}-1)*\Delta P_{rampup}\}$, the transmit power used for sending the random access message, where $X_{PL}$ is a path loss compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

The processor 51 is specifically configured to determine, according to $P=\min\{P_{MAX}, P_{initial\ value}+(N_{pre}-1)*[\Delta P_{rampup}+\Delta P_{rampup}*(N-1)*X_{\Delta P}]\}$, the transmit power used for sending the random access message, where $X_{\Delta P}$ is a step compensation coefficient, P is the transmit power used for sending the random access message, $P_{MAX}$ is maximum transmit power, $P_{initial\ value}$ is initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

For this embodiment of the present disclosure, $P_{initial\ value}$ is determined by the processor 51 according to $P_{initial\ value} = PL + P_{o\_pre} + \Delta_{pre}$, where PL is a downlink path loss, $P_{o\_pre}$ is initial target receive power for a preamble code carried in the random access message, and $\Delta_{pre}$ is a format offset of the preamble code.

The processor 51 is further configured to: when the quantity of attempt rounds for the random access message is greater than or equal to 2, record a cell identity of a current cell.

The processor 51 is further configured to: when the cell identified by the cell identity is re-entered and the random access message is sent to the base station, determine, according to the quantity of attempt rounds that is an integer greater than or equal to 2, the transmit power used for sending the random access message.

The processor 51 is further configured to: when time in which the cell identity is being recorded is greater than or equal to preconfigured time, delete the recorded cell identity.

The processor 51 is further configured to: when the user equipment restarts, delete the recorded cell identity.

In the user equipment according to this embodiment of the present disclosure, a processor first determines, according to a preconfigured rule, transmit power used for sending a random access message, and then a transceiver sends the random access message to a base station by using the transmit power determined by the processor. Compared with a current manner in which transmit power is directly determined by using a downlink path loss, in this embodiment of the present disclosure, the transmit power is increased by a compensation value, so that the transmit power can be increased by appropriate compensation when the downlink path loss is less than an uplink path loss. Therefore, it can be ensured that the random access message sent according to transmit power to which the compensation value is added can be sent to the base station, and further, a success rate of establishing a connection between the UE and the base station can be improved.

Further, in the user equipment according to this embodiment of the present disclosure, the UE preconfigures a quantity of times for sending according to maximum transmit power in a process of a current round of a random access attempt, which can increase compensation power for the random access message or step compensation power for the random access message according to a user requirement, can reduce a quantity of sending times required to reach the maximum transmit power, and can further shorten attempt time for establishing the connection between the UE and the base station. Transmit power that is of the first round and is determined by using each of foregoing formulas is the same as the transmit power that exists before the compensation value is added, which can avoid a case in which compensation is still performed on the transmit power when the random access message can be sent to the base station by using the transmit power that exists before the compensation value is added, and can reduce current transmit power of the UE and reduce interference in another UE. A recorded cell ID is deleted after preconfigured time is reached, which can avoid a case in which when the uplink path loss and the downlink path loss change, the UE always sends the random access message according to the transmit power obtained after the compensation value is added, and can decrease the current transmit power of the UE and reduce the interference in the another UE on condition that the connection successfully established between the UE and the base station is ensured. When the UE re-enters a cell identified by the cell ID and sends the random access message to the base station, the UE directly determines, according to a quantity N of attempt rounds that is an integer greater than or equal to 2, the transmit power obtained after the compensation value is added, and sends the random access message according to the transmit power obtained after the compensation value is added, which can avoid a step of sending the random access message in the first round according to the transmit power that exists before the compensation value is added, and can further shorten the attempt time for establishing the connection between the UE and the base station.

It should be noted that for other corresponding descriptions of devices in the user equipment provided in this embodiment of the present disclosure, reference may be made to the corresponding description in FIG. 1 or FIG. 2, and details are not described herein again.

The method for determining transmit power and the user equipment according to the embodiments of the present disclosure may be applicable to establishment of a connection between the user equipment and a base station, but are not limited thereto.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a transmit power, comprising:
   determining by a processor included in a user equipment, according to a preconfigured rule, a transmit power used for sending a random access message; and
   sending, by the processor included in the user equipment, the random access message to a base station by using the transmit power,
   wherein the determining, according to the preconfigured rule, the transmit power used for sending the random access message comprises determining a minimum value of:
   a maximum transmit power value, and a value computed based on an initial transmit power and an added value of transmit power for sending the random access message two consecutive times in a process of a current round of a random access attempt.

2. The method according to claim 1, wherein the determining, according to the preconfigured rule, the transmit power used for sending the random access message comprises:

determining, according to $P=\{P_{MAX}, P_{initial\ value}, (N_{pre}-1)*\Delta P_{rampup}, (N-1)*P_{compensation}\}$, the transmit power used for sending the random access message, wherein $P_{compensation}$ is compensation power, $P$ is the transmit power used for sending the random access message, $P_{MAX}$ is a maximum transmit power, $P_{initial\ value}$ is an initial transmit power, $\Delta P_{rampup}$ is an added value of transmit power for sending the random access message two consecutive times in a process of a current round of a random access attempt, $N_{pre}$ a quantity of times for sending the random access message in the process of the current round of the random access attempt, $N_{pre}$ is integer greater than or equal to 1 and less than or equal to $N_{pre\ max}$, $N_{pre\ max}$ is a maximum quantity of attempts in the process of the current round of the random access attempt, $N$ is a quantity of attempt rounds for the random access message, and $N$ is an integer greater than or equal to 1.

3. The method according to claim 2, wherein $P_{compensation}$ is preconfigured; and before the determining, according to $P=\min\{P_{MAX}, P_{initial\ value}+(N_{pre}-1)*\Delta P_{rampup}+(N-1)*P_{compensation}\}$, the transmit power used for sending the random access message, the method further comprises:

acquiring $P_{compensation}$ from a nonvolatile entry.

4. The method according to claim 2, wherein before the determining, according to $P=\min\{P_{MAX}, P_{initial\ value}+(N_{pre}-1)*\Delta P_{rampup}+(N-1)*P_{compensation}\}$ the transmit power used for sending the random access message, the method further comprises:

determining $P_{compensation}$, wherein determining $P_{compensation}$ comprises:

determining $P_{compensation}$ according to $P_{compensation}=P_{MAX}-[P_{initial\ value}+(N_{pre\ max}-1)*\Delta P_{rampup}]$, wherein $P_{MAX} \geq P_{initial\ value}+(N_{pre\ max}-1)*\Delta P_{rampup}$; or determining $P_{compensation}$ according to $P_{compensation}=P_{MAX}-[P_{initial\ value}+(N_{pre\ max}-X)*\Delta P_{rampup}]$, wherein $P_{MAX} \geq P_{initial\ value}+(N_{pre\ max}-1)*\Delta P_{rampup}$, and X is a quantity of times for sending according to the maximum transmit power in the process of the current round of the random access attempt.

5. The method according to claim 2, wherein $P_{initial\ value}$ is determined according to $P_{initial\ value}=PL+P_{o\_pre}+\Delta_{pre}$, wherein PL is a downlink path loss, $P_{o\_pre}$ is initial target receive power for a preamble code carried in the random access message, and $\Delta_{pre}$ is a format offset of the preamble code.

6. The method according to claim 1, wherein the determining, according to the preconfigured rule, the transmit power used for sending the random access message comprises:

determining, according to $P=\min\{P_{MAX}, P_{initial\ value}+(N_{pre}-1)*[\Delta P_{rampup}+(N-1)*(N_{pre}-1)*P_{step\ compensation}]\}$, the transmit power used for sending the random access message, wherein $P_{step\ compensation}$ is step compensation power, $P$ is the transmit power used for sending the random access message, $P_{MAX}$ is a maximum transmit power, $P_{initial\ value}$ is an initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, $N$ is a quantity of attempt rounds for the random access message, and $N$ is an integer greater than or equal to 1.

7. The method according to claim 6, wherein $P_{step\ compensation}$ is preconfigured; and before the determining, according to $P=\min\{P_{MAX}, P_{initial\ value}+(N_{pre}-1)*[\Delta P_{rampup}+(N-1)*(N_{pre}-1)*P_{step\ compensation}]\}$, the transmit power used for sending the random access message, the method further comprises:

acquiring $P_{step\ compensation}$ from a nonvolatile entry.

8. The method according to claim 6, wherein before the determining, according to $P=\min\{P_{MAX}, P_{initial\ value}+(N_{pre}-1)*[\Delta P_{rampup}+(N-1)*(N_{pre}-1)*P_{step\ compensation}]\}$, the transmit power used for sending the random access message, the method further comprises:

determining $P_{step\ copensation}$, wherein determining $P_{step\ compensation}$ comprises:

determining $P_{step\ compensation}$ according to $P_{step\ compensation}=\{P_{MAX}-[P_{initial\ value}+(N_{pre\ max}-1)*\Delta P_{rampup}]\}/(N_{pre\ max}-1)$ wherein $P_{MAX} \geq P_{initial\ value}+(N_{pre\ max}-1)*\Delta P_{rampup}$; or determining $P_{step\ compensation}$ according to $P_{step\ compensation}=\{P_{MAX}-[P_{initial\ value}+(N_{pre\ max}-X)*\Delta P_{rampup}]\}/(N_{pre\ max}-X)$, wherein $P_{MAX} \geq P_{initial\ value}+(N_{pre\ max}-1)*\Delta P_{rampup}$ and X is a quantity of times for sending according to the maximum transmit power in the process of the current round of the random access attempt.

9. The method according to claim 1, wherein the determining, according to the preconfigured rule, the transmit power used for sending the random access message comprises:

determining, according to $P=\min\{P_{MAX}, P_{initial\ value}+PL*(N-1)*X_{PL}+(N_{pre}-1)*\Delta P_{rampup}\}$ the transmit power used for sending the random access message, wherein $X_{PL}$ is a path loss compensation coefficient, $P$ is the transmit power used for sending the random access message, $P_{MAX}$ is a maximum transmit power, $P_{initial\ value}$ is an initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is integer greater than or equal to 1 and less than or equal to $N_{pre\ max}$, $N_{pre\ max}$ is a maximum quantity of attempts in the process of the current round of the random access attempt, $N$ is a quantity of attempt rounds for the random access message, and $N$ is an integer greater than or equal to 1.

10. The method according to claim 1, wherein the determining, according to the preconfigured rule, the transmit power used for sending the random access message comprises:

determining, according to P=min $\{P_{MAX}, P_{initial\ value}+(N_{pre}-1)*[\Delta P_{rampup}+\Delta P_{rampup}*(N-1)*X_{\Delta P}]\}$, the transmit power used for sending the random access message, wherein $X_{\Delta P}$ is a step compensation coefficient, P is the transmit power used for sending the random access message, $P_{MAX}$ is a maximum transmit power, $P_{initial\ value}$ is an initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

11. A user equipment, comprising:
a processor, configured to determine, according to a preconfigured rule, a transmit power used for sending a random access message; and
a transceiver, configured to send the random access message to a base station by using the transmit power determined by the processor,
wherein the processor is configured to determine, according to the preconfigured rule, the transmit power used for sending the random access message based on determining a minimum value of:
  a maximum transmit power value, and
  a value computed based on an initial transmit power and an added value of transmit power for sending the random access message two consecutive times in a process of a current round of a random access attempt.

12. The user equipment according to claim 11, wherein the processor is configured to determine, according to P=min $\{P_{MAX}, P_{initial\ value}+(N_{pre}-1)*\Delta P_{rampup}+(N-1)*P_{compensation}\}$, the transmit power used for sending the random access message, wherein $P_{compensation}$ is compensation power, P is the transmit power used for sending the random access message, $P_{MAX}$ is a maximum transmit power, $P_{initial\ value}$ is an initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

13. The user equipment according to claim 12, wherein $P_{compensation}$ is preconfigured; and
$P_{compensation}$ acquired by the processor from a nonvolatile entry.

14. The user equipment according to claim 12, wherein $P_{compensation}$ determined by the processor according to $P_{compensation}=P_{MAX}-[P_{initial\ value}+(N_{pre\ max}-1)*\Delta P_{rampup}]$, wherein $P_{MAX} \geq P_{initial\ value}+(N_{pre\ max}-1)*\Delta P_{rampup}$; or
$P_{compensation}$ determined by the processor according to $P_{compensation}=P_{MAX}-[P_{initial\ value}+(N_{pre\ max}-X)$ $*\Delta_{rampup}]$, wherein $P_{MAX} \geq P_{initial\ value}+(N_{pre\ max}-1)*\Delta P_{rampup}$, and X is a quantity of times for sending according to the maximum transmit power in the process of the current round of the random access attempt.

15. The user equipment according to claim 11, wherein the processor is configured to determine, according to P=min $\{P_{MAX}, P_{initial\ value}+PL*(N-1)*X_{PL}+(N_{pre}-1)*\Delta P_{rampup}\}$, the transmit power used for sending the random access message, wherein $X_{PL}$ is a path loss compensation coefficient, P is the transmit power used for sending the random access message, $P_{MAX}$ is a maximum transmit power, $P_{initial\ value}$ is an initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

16. The user equipment according to claim 12, wherein $P_{initial\ value}$ is determined by the processor according to $P_{initial\ value}=PL+P_{o\_pre}+\Delta_{pre}$, wherein PL is a downlink path loss, $P_{o\_pre}$ is initial target receive power for a preamble code carried in the random access message, and $\Delta_{pre}$ is a format offset of the preamble code.

17. The user equipment according to claim 11, wherein the processor is configured to determine, according to P=min $\{P_{MAX}, P_{initial\ value}+(N_{pre}-1)*[\Delta P_{rampup}+(N-1)*(N_{pre}-1)*P_{compensation}]\}$, the transmit power used for sending the random access message, wherein $P_{step\ compensation}$ is step compensation power, P is the transmit power used for sending the random access message, $P_{MAX}$ is a maximum transmit power, $P_{initial\ value}$ is an initial transmit power, $\Delta P_{rampup}$ is an added value of transmit power for sending the random access message two consecutive times in a process of a current round of a random access attempt, $N_{pre}$ is a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

18. The user equipment according to claim 17, wherein $P_{step\ compensation}$ is preconfigured; and
$P_{step\ compensation}$ is acquired by the processor from a nonvolatile entry.

19. The user equipment according to claim 17, wherein $P_{compensation}$ is determined by the processor according to $P_{compensation}=\{P_{MAX}-[P_{initial\ value}+(N_{pre\ max}-1)*\Delta P_{rampup}]\}/(N_{pre\ max}-1)$, wherein $P_{MAX} \geq P_{initial\ value}+(N_{pre\ max}-1)*\Delta P_{rampup}$; or
$P_{step\ compensation}$ determined by the processor according to $P_{step\ compensation}=\{P_{MAX}-[P_{initial\ value}+(N_{pre\ max}-X)*\Delta P_{rampup}]\}/(N_{pre\ max}-X)$, wherein $P_{MAX} \geq P_{initial\ value}+(N_{pre\ max}-1)*\Delta P_{rampup}$, and X is a quantity of times for sending according to the maximum transmit power in the process of the current round of the random access attempt.

20. The user equipment according to claim 11, wherein the processor is configured to determine, according to $P=\min\{P_{MAX}, P_{initial\ value}+(N_{pre}-1)*[\Delta P_{rampup}+\Delta P_{rampup}*(N-1)*X_{\Delta P}]\}$, the transmit power used for sending the random access message, wherein $X_{\Delta P}$ is a step compensation coefficient, P is the transmit power used for sending the random access message, $P_{MAX}$ is a maximum transmit power, $P_{initial\ value}$ is an initial transmit power, $\Delta P_{rampup}$ is an added value of transmit power for sending the random access message two consecutive times in a process of a current round of a random access attempt, $N_{pre}$ a quantity of times for sending the random access message in the process of the current round of the random access attempt, $N_{pre}$ is an integer greater than or equal to 1 and less than or equal to $N_{pre\ max}$, $N_{pre\ max}$ is a maximum quantity of attempts in the process of the current round of the random access attempt, N is a quantity of attempt rounds for the random access message, and N is an integer greater than or equal to 1.

* * * * *

UNITED STATES PATENT AND TRADEMARK OFFICE
CERTIFICATE OF CORRECTION

PATENT NO. : 9,832,742 B2
APPLICATION NO. : 15/377342
DATED : November 28, 2017
INVENTOR(S) : Jin et al.

It is certified that error appears in the above-identified patent and that said Letters Patent is hereby corrected as shown below:

Column 25, Line 10, in Claim 2 "$P = \{P_{MAX}\ P_{initial\ Value}\ (N_{Pre}-1)$" should read
-- $P = \min\ \{P_{MAX},\ P_{initial\ Value} + (N_{Pre}-1)$ --.

Column 25, Line 11, in Claim 2 "$*\Delta P_{rampup}\ (N-1)*P_{compensation}\}$" should read
-- $*\Delta P_{rampup} + (N-1)*P_{compensation}\}$ --.

Signed and Sealed this
Twenty-ninth Day of May, 2018

Andrei Iancu
*Director of the United States Patent and Trademark Office*